United States Patent
Tanner

(10) Patent No.: US 7,334,057 B2
(45) Date of Patent: Feb. 19, 2008

(54) METHOD AND DEVICE FOR TRANSMISSION OF VIDEO DATA

(75) Inventor: Thomas Tanner, Bobingen (DE)

(73) Assignee: Citron Gesellschaft fur cad Industrie Elektronik mbH, Augsburg (DE)

( * ) Notice: Subject to any disclaimer, the term of this patent is extended or adjusted under 35 U.S.C. 154(b) by 463 days.

(21) Appl. No.: 10/814,781

(22) Filed: Mar. 31, 2004

(65) Prior Publication Data

US 2005/0015527 A1 Jan. 20, 2005

(51) Int. Cl.
- G06F 3/00 (2006.01)
- H04N 7/173 (2006.01)
- H04N 7/16 (2006.01)

(52) U.S. Cl. ............... 710/30; 710/60; 710/62; 725/90; 725/135; 725/143

(58) Field of Classification Search ............ 710/30, 710/60, 62; 725/90, 135, 143

See application file for complete search history.

(56) References Cited

U.S. PATENT DOCUMENTS

| | | | | |
|---|---|---|---|---|
| 5,742,274 A | * | 4/1998 | Henry et al. | 345/698 |
| 5,941,972 A | * | 8/1999 | Hoese et al. | 710/315 |
| 6,118,817 A | * | 9/2000 | Wang | 375/240.03 |
| 6,212,232 B1 | * | 4/2001 | Reed et al. | 375/240.03 |
| 6,522,352 B1 | * | 2/2003 | Strandwitz et al. | 348/211.2 |
| 6,631,240 B1 | * | 10/2003 | Salesin et al. | 386/68 |
| 2004/0078822 A1 | * | 4/2004 | Breen et al. | 725/86 |

* cited by examiner

*Primary Examiner*—Alan Chen
(74) *Attorney, Agent, or Firm*—Patrick Stellitano

(57) ABSTRACT

A video device is provided that reduces an original frame rate of video frames by grabbing only every $n^{th}$ video frame and substantially restoring the original video frame rate by reproducing a video frame up to n times or increasing the video frame rate by reproducing a video frame more than n times. In this way, the original frame rate is reduced without compression of the video data, and a higher frame rate may be restored without decompression.

20 Claims, 3 Drawing Sheets

METHOD AND DEVICE FOR TRANSMISSION OF VIDEO DATA

PRIORITY

This application claims priority under 35 USC 119(e) of German patent application No. 103 15 0188.

FIELD

The invention relates to a device for transmitting video data of the type claimed in claim 1 and to a corresponding method of the type claimed in claim 12.

BACKGROUND

The transmission of video data requires great bandwidths. According to the SXGA (Super Extended Graphics Array) Standard, frames are generated, for example, with a resolution of 1280×1024 pixels with 24 bits per pixel and with a frame rate of 60 Hz. A serial video data stream for transmission of said frames has a data rate of about 2.59 GBit/s. Therefore, a data link for transmitting such a video data stream needs to have a bandwidth of about 1.3 GHz. In particular, for transmission of such video data streams over long distances, for example, from host computers to remote terminals, however, a bandwidth of this size is often not available.

In order to avoid this problem, it is known to compress video data prior to transmission, for example, by means of the MPEG algorithm. MPEG allows efficient data compression, but leads to information losses in the video data. For certain applications, such information losses are unacceptable. By way of example, reference is made herein to the use of remote terminals in industrial environments serving to control and monitor machines. On such terminals, inter alia, measurement data of machines are displayed which require a high resolution. By compression of the video data transmitted to said remote terminals, important details of the measurement data to be displayed could be lost.

SUMMARY

Therefore, it is the object of the invention to propose a device and a method for transmitting video data, wherein no conventional compression of the video data to be transmitted, such as MPEG, for example, is required.

This object is achieved by a device for transmitting video data comprising the features claimed in claim 1 and by a corresponding method comprising the features as claimed in claim 12. Preferred embodiments of the invention are evident from the dependent claims.

It is an essential concept of the invention to reduce the frame rate of the video data to be transmitted. This reduces the data rate of the video data and does not require a lossy compression to be effected with the frames contained in said video data. This procedure is of particular advantage in applications for which a lossy compression of the frames is not acceptable, as explained above, because this could result in the loss of important information in said frames.

In particular, the invention relates to a device for transmitting video data, comprising
  a host device,
  a remote device, and
  a data link between the host device and the remote device.
  The host device comprises adjusting means which are provided to reduce the data rate of video data transmitted from a video data source to the host device by reducing the frame rate of the video data. This enables the host device to transmit the video data at the reduced data rate to the remote device via the data link. Above all, the invention enables transmission of high-resolution frames according to the SXGA standard, for example, without applying a lossy compression in the form of a serial bit data stream.

In a first preferred embodiment, the adjusting means comprise a first frame buffer and buffer control means. The buffer control means are provided such that every $n^{th}$ frame to be transmitted via the data link is grabbed from the video data and stored in said first frame buffer. Thus, according to this embodiment, not all frames of the video data are transmitted from the video data source. Instead, only every $n^{th}$ frame, for example every second, every third or every fourth frame, is transmitted. A reduction of the data rate to about 50% in the first case, to about 33% in the second case and to about 25% in the third case is achieved with respect to the original data rate of the video data. Mainly when transmitting substantially static image contents, the information loss resulting from skipping frames plays as good as no role. Transmission of only every nth frame causes the frame rate of the video data to be reduced by a factor of 1/n.

In a second preferred embodiment, the adjusting means comprise an information storage device in which information for the video data source to adjust the frame rate of the video data supplied by the video data source is stored. Said information storage device may be an EEPROM, for example, in which said information is stored. In this embodiment, the video data source already supplies a video data stream having a data rate reduced according to the information in the information storage device.

The video data source is preferably a computer comprising a graphics unit capable of generating a video data stream which is transmitted to the host device and comprising a DVI (Digital Visual Interface), a DFP (Digital Flat Panel) interface and/or a P&D (Plug & Display) interface by means of which the adjusting means are connected to the graphics unit. The interface may be used to define at which data rate the graphics unit should generate a video data stream and transmit it to the host device. This allows to achieve an efficient reduction of the data rate of the video data stream without great technical complexity.

The data link may comprise an electrical and/or optical connection. The electrical connection may be realized, for example, by a twisted-pair cable. The optical connection preferably uses optical fibers, in particular glass fibers. The glass fibers of use may be, for example, commercially available multi-mode fibers, such as a 50 μm duplex multi-mode fiber with lengths of up to several 100 meters.

In a particularly preferred embodiment, the data link is a serial data link, i.e. video data are transmitted serially, preferably bit-serially, by said data link. In particular, where greater distances are to be covered between the host device and the remote device, use can thus be made of inexpensive lines for said data link. For example, this allows the host device to be accommodated in a building, e.g. an air-conditioned computer room, while the remote device is located at the point of use, such as a production environment or an operating theater, for example. Typical fields of application in this connection are found, for example, in the car-manufacturing industry, for controlling and monitoring large printing machines, in industrial automation, in medical systems, in military applications, in the food industry, in public information terminals, in test systems, in telecommunication technology, in ticket-vending machines and in civil marine and aviation applications.

In a further embodiment, the remote device may comprise a second frame buffer in which frames of the video data received via the data link are stored. Using said second frame buffer, the original frame rate may be reconstructed again. This can be effected by a frame stored in the second frame buffer being output n times. Therefore, the second frame buffer is preferably a double buffer memory allowing simultaneous writing and reading of data. This allows data to be read out while new data are being written into said double buffer memory.

In order to enable the reconstruction of the original frame rate or of any predetermined frame rate, the remote device preferably comprises a frame rate conversion unit, which reads the frames from the second frame buffer according to the predetermined frame rate and outputs them as a video data stream at the predetermined frame rate.

The remote device may also comprise a picture generator which can generate a test picture. This allows easy testing of a screen connected to the remote device.

Finally, the host device and the remote device may be provided such that, in addition to the video data, control data may be transmitted via the data link. As control data, sideband signals are preferably transmitted which serve to interact with a user. More precisely, said sideband signals may comprise inputs by a keyboard, a mouse, a touch-screen or the like via user interfaces. This allows not only the output of frames on a screen connected to the remote device, but also operation of a computer connected to the host device via the remote device and of input devices connected to it, such as a keyboard, a touch-screen, a mouse or similar input devices.

According to a further aspect, the invention relates to a method of transmitting video data via a data link between a host device and a remote device, said host device reducing the data rate of the video data by reducing the frame rate of said video data, so as to enable transmission of the video data to the remote device via said reduced data link.

The host device preferably grabs every $n^{th}$ frame to be transmitted via the data link from the video data and stores it. This reduces the frame rate and thus the data rate to be transmitted in the host device.

Alternatively, information may also be transmitted from the host device to a video data source, said information serving to adjust the frame rate of the video data supplied by the video data source. In this case, the reduction is effected by the video data source itself, controlled by the host device.

The video data may be transmitted by electrical and/or optical means via the data link. Optical transmission has the advantage of increased security against interference as compared to electric transmission. Therefore, it is preferably used in an industrial environment, such as a production hall, for example, where electromagnetic interferences may occur which would disturb electric transmission.

The video data are preferably transmitted as a serial video data stream via the data link. As already mentioned above, serial transmission has the advantage that inexpensive lines can be used for the data link.

In a particularly preferred embodiment, the remote device stores frames of the video data received via the data link, which are then read out according to a predetermined frame rate and displayed on a screen. This allows the reconstruction of the original frame rate, so that the information displayed on the screen has a frame rate that is pleasant for a viewer.

Finally, in addition to the video data, the host device and the remote device can transmit control data via the data link. Such control data may serve to adjust the remote device, for example, or may originate from input devices which are connected to the remote device and serve as user interface, such as a keyboard, a mouse, a touch-screen or similar input devices, for example.

Further advantages and possible applications of the present invention are evident from the following description in connection with the embodiment examples shown in the drawings.

In the description, claims, abstract and drawings, use is made of the terms used in the list of reference numerals given hereinafter and of the reference numerals associated therewith.

DRAWINGS

DESCRIPTION OF EMBODIMENTS

Figure 1:
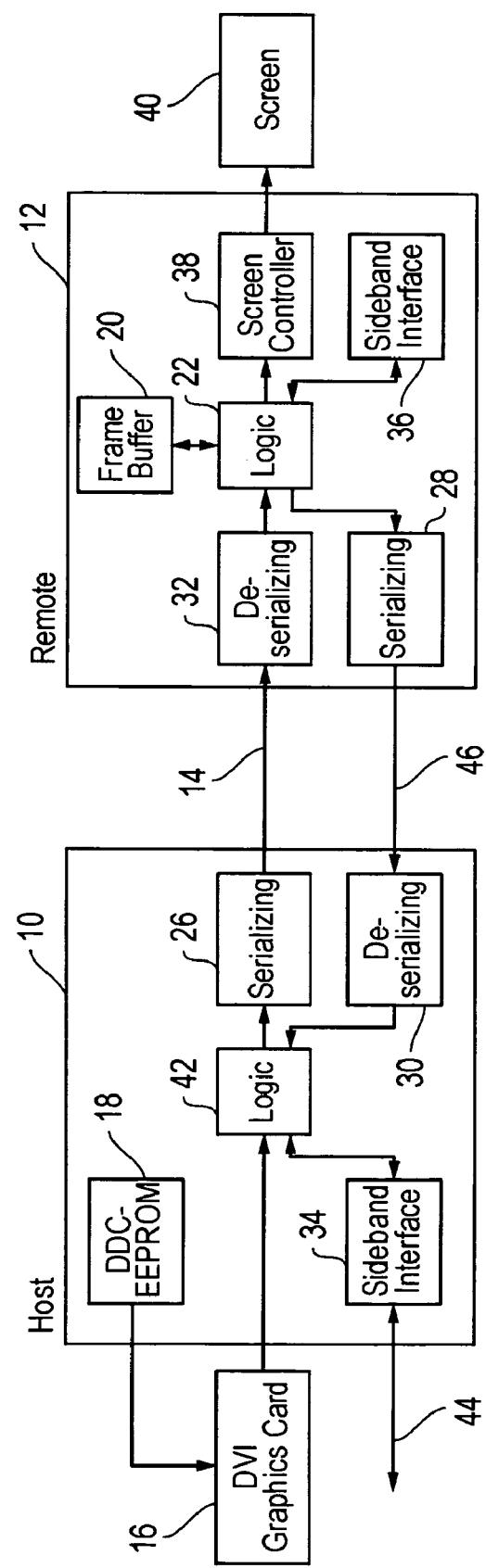
FIG. 1 shows a block diagram of an embodiment of the device according to the invention.

In FIG. 1, a host device 10 is connected to a remote device 12, to communicate therewith, via a data link 14 for video data. Further, the host device 10 and the remote device 12 are connected in communication with each other via a data link 46 for control data.

The host device 10 receives video data or a video data stream from a video data source 16, for example a DVI graphics card. The video data source 16 may be part of a computer, for example, which is not shown and on which a program for controlling a production plant is executed in an industrial environment. The host device 10 further receives or transmits sideband signals 44 which have been generated or may be further processed by the aforementioned computer. These sideband signals 44 may comprise, for example, control signals or control data resulting, in particular, from keyboard inputs, inputs from a touch-screen, which is connected to the remote device 12, for example, or by USB devices which are connected to the remote device.

The host device 10 comprises adjusting means 18, which may be an EEPROM, for example. The adjusting means 18 control the video data source 16 such that the frame rate of the video data generated by the video data source is reduced. If the adjusting means 18 are said EEPROM, for example, information of a display or a screen may be stored in said EEPROM. Said information may be provided such that the video data source 16 adjusts the frame rate of the video data according to said information. For example, if information about a frame rate of 30 Hz is stored in the EEPROM, the video data source 16 also adjusts the frame rate of the video data generated by it and transmitted to the host device 10 to 30 Hz. It is thus possible to reduce the data rate of the video data generated by the video data source 16 without particularly complex circuitry.

The video data generated by the video data source 16 are supplied to a host control logic 42 in the host device 10. The host control logic 42 processes the supplied video data such, for example, that it combines them with control data from the first sideband interface 34 to form one single stream of video and control data. As already mentioned, the first sideband interface 34 may either output the already mentioned sideband signals 44 to the computer, for example, which is not shown, or may receive control signals for the remote device 12 from said computer in order to supply them to the host control logic 42.

A first serializing unit 26, arranged following the host control logic 42, converts the video data and control data stream generated by the host control logic 42 to a serial bit data stream which is transmitted to the remote device 12 via the data link 14. The first serializing unit 26 may be, for example, a serial transmitter having a data transmission rate of 1.32 GBit/s, such as that available from INOVA Semiconductors under the trade name Gigastar, type INGT165B. It should be noted here that the host control logic 42 may be implemented, for example, in the form of an FPGA (Field Programmable Gate Array).

The remote device 12 comprises a first deserializing unit 32 which converts the serial bit data stream received via the data link 14 to a parallel video data and control data stream. Said video data and control data stream is supplied to a remote control logic 22 which separates the video data and control data and generates one video data stream and one control data stream. It stores the frames contained in the video data stream in a frame buffer 20.

The individual frames stored in the frame buffer 20 are read out by a frame rate converter unit 54 (FIG. 3) at a predetermined rate so as to reconstruct the original frame rate again. For example, if the frame rate has been reduced from 60 Hz to 30 Hz, each frame stored in the frame buffer 20 is read out twice by the frame rate converter unit 22 and transmitted by it to a screen control unit 38 in the remote device 12 which is connected to a screen 40. On the basis of the supplied frames, the screen control unit 38 generates signals for controlling the screen 40, which may be a TFT display, for example.

The remote device 12 further comprises a second sideband interface 36, which can generate sideband signals from control data supplied by the remote control logic 22 or, in the opposite case, can generate control data from sideband signals from, for example, a keyboard connected to the remote device 12. The second sideband interface 36 transmits control data to the remote control logic 22 which generates a data stream therefrom that is transmitted to a second deserializing unit 28, which generates a serial bit data stream from the received data, said serial bit data stream being transmitted to the host device 10, or, more specifically, to a second deserializing unit 30 in the host device, via the data link 46 for control signals. It should be noted here that the remote control logic 22 may be implemented as an FPGA. The frame rate converter unit 54 may also be implemented as an FPGA or as a commercially available component for converting the frame rate, such as offered by GENESIS Microchip, for example.

Figure 2:
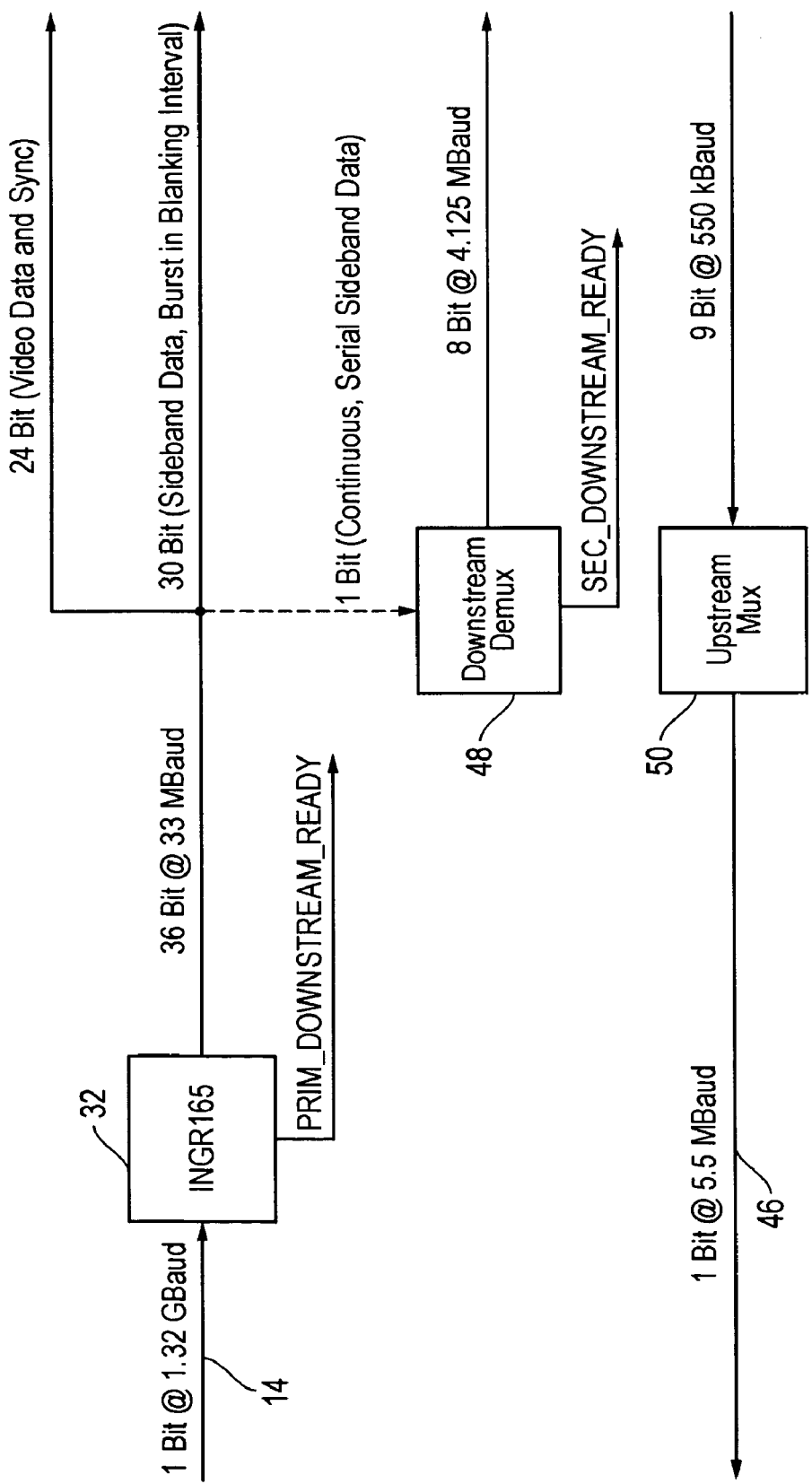
FIG. 2 shows a block diagram of a first embodiment example of the remote device according to the invention.

FIG. 2 shows part of the circuitry of the remote device 12 and of the data streams processed in the remote device 12. The first deserializing unit 32, a Gigastar Chip of the INGR165B type from INOVA Semiconductors, receives a serial bit data stream having a data rate of 1.32 GBaud. This bit data stream comprises both video data and control data or sideband signals, respectively. On the basis of said serial bit data stream, the first deserializing unit 32 generates a data stream of parallel data words at 3.6 bits each which has a data rate of 33 MBaud. 24 bits are coupled out from the parallel data stream as video data and synchronization signals for the screen 40.

Further, 30 bits of control data comprising sideband signals and burst data in the blanking interval are coupled out and transmitted to corresponding devices. Finally, a 1-bit data stream with continuous serial sideband data is coupled out and supplied to a demultiplexer 48. Said demultiplexer 48 generates a parallel data stream therefrom with 8 bits at a data rate of 4.125 MBaud and transmits it to the screen 40. Using these data, special information can be displayed on the screen.

Further, a multiplexer 50 is provided which receives a parallel data stream of 9 bits at a data rate of 550 kBaud. In said parallel data stream, control signals from, for example, keyboards, mice or touch signals from a touch screen are transmitted. On the basis of the received parallel data stream, the multiplexer 50 generates a serial 1-bit data stream having a data rate of 5.5 MBaud. This serial data stream is transmitted from the remote device 12 to the host device 10 via the data link 46 for the control data. The multiplexer 50 substantially forms the second serializing unit 28, which generates a serial data stream of control data or sideband signals, respectively, for transmission from the remote device 12 to the host device 10.

Figure 3:
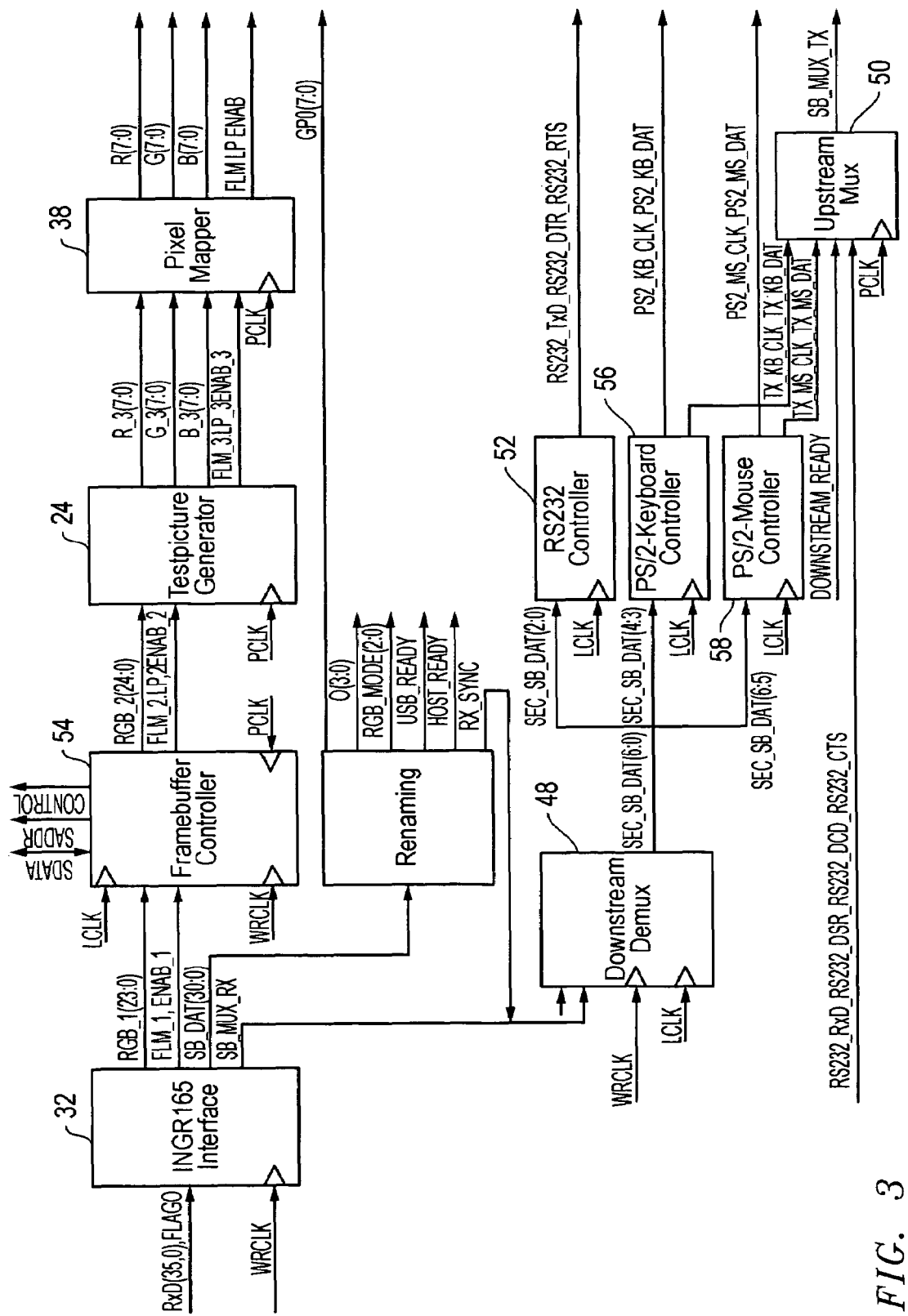
FIG. 3 shows a block diagram of a second embodiment example of the remote device according to the invention.

FIG. 3 shows part of a remote device 12 according to the invention, wherein received frames are stored in a frame buffer, not shown, and are read out by means of a frame rate converter unit 54, thus achieving the original frame rate or a higher frame rate than that contained in the received video data stream. A picture generator 24 supplies the video data generated by the frame rate converter unit 54 to a screen control unit 38 which converts the supplied data to signals for controlling a screen, for example to RGB signals. The picture generator 24 serves to generate test pictures which can be displayed on said screen.

Further, an RS232 controller 52, a PS/2 keyboard controller 56 and a PS/2 mouse controller 58 for connection to RS232 devices, keyboards and mice with PS/2 connections to the remote device 12 are provided. Control data or sidebeand signals, respectively, generated by these devices are supplied by the controllers 52, 56 and 58 to a multiplexer 50, which generates a serial data stream therefrom which is transmitted from the remote device 12 to the host device 10 via the data link 46 shown in FIG. 1. The host device 10 supplies the control data contained in said data stream, in a correspondingly processed form, to a computer connected to it for evaluation. In the opposite case, sideband signals or control data are obtained via the bit-serial video data and control data stream received by the remote device 12 via the data link 14, said data, for example, coming from the computer which is connected to the host device 10. These control data are converted to parallel data words by a demultiplexer 48 and supplied to the controllers 52, 56 und 58 for processing.

The present invention enables transmission of highresolution frames according to the SXGA standard, for example, in particular via serial high-speed data links. For this purpose, frames to be transmitted need not be compressed, which might lead to a loss of information that is inacceptable for certain applications.

LIST OF REFERENCE NUMERALS

10 host device
12 remote device
14 data link for video data
16 video data source
18 adjusting means
20 frame buffer 22 remote control logic
24 picture generator
26 first serializing unit
28 second serializing unit
30 second deserializing unit
32 first deserializing unit
34 first sideband interface
36 second sideband interface
38 screen control unit
40 screen
42 host control logic
44 sideband signals
46 data link for control data
48 demultiplexer
50 multiplexer
52 RS232 controller
54 frame rate converter unit
56 PS/2 keyboard controller
58 PS/2 mouse controller

The invention claimed is:

1. A device for compression-less transmission of video data and decompression-less production of video data, comprising:
 a host device;
 a remote device; and
 a data link between the host device and the remote device; wherein said host device comprises an adjusting mechanism to reduce the data rate of video data transmitted from a video data source to the host device by reducing an original frame rate by n-1 frames out of every n frames of the video data, which enables the host device to transmit the video data at the reduced data rate to the remote device via the data link; and wherein the remote device reproduces a frame up to n times.

2. The device of claim 1, wherein the adjusting mechanism comprises a first frame buffer and buffer control mechanism provided such that every nth frame to be transmitted via the data link is grabbed from the video data and stored in said first frame buffer.

3. The device of claim 1, wherein the adjusting mechanism comprises an information storage device that stores information used by the video data source to adjust the frame rate of the video data supplied by the video data source.

4. The device of claim 3, wherein the video data source is preferably a computer comprising:
 a graphics unit capable of generating a video data stream which is transmitted to the host device; and
 a DVI, a DFP interface and/or a P&D interface to enable connection of the adjusting mechanism to the graphics unit.

5. The device of claim 1, wherein the data link comprises an electrical and/or optical connection.

6. The device of claim 5, wherein the data link is a serial data link.

7. The device of claim 1, wherein the remote device comprises a second frame buffer where frames of the video data received via the data link are stored.

8. The device of claim 7, wherein the second frame buffer is a double buffer memory.

9. The device of claim 7, wherein the remote device comprises a frame rate conversion unit which reads frames from the second frame buffer according to a predetermined frame rate to reproduce a frame up to n times.

10. The device of claim 1, wherein the host device and the remote device are provided such that, in addition to the video data, control data may be transmitted via the data link.

11. A compression-less method of transmitting video data through a data link between a host device and a remote device and decompression-less production of video data, said host device reducing the data rate of the video data by reducing an original frame rate by n-1 frames out of every n frames of said video data, so as to enable transmission of the video data via said data link to the remote device at the reduced data rate; and wherein the remote device reproduces a frame up to n times.

12. The method of claim 11, wherein the host device grabs every $n^{th}$ frame to be transmitted via the data link from the video data and stores it.

13. The method of claim 11, wherein information for adjusting the frame rate of the video data supplied by a video data source is transmitted from the host device to the video data source.

14. The method of claim 11, wherein the video data are transmitted by electrical and/or optical means via the data link.

15. The method of claim 14, wherein the video data are transmitted as a serial video data stream via the data link.

16. The method of claim 11, wherein the remote device stores frames of the video data received via the data link, said stored frames being read out according to a predetermined frame rate and displayed on a screen, reproducing a frame up to n times.

17. The method of claim 11, wherein, in addition to the video data, the host device and the remote device transmit control data via the data link.

18. The device of claim 1, wherein the remote device reproduces a frame more than n times to produce a frame rate greater than the original frame rate.

19. The method of claim 11, wherein the remote device reproduces a frame more than n times to produce a frame rate greater than the original frame rate.

20. The device of claim 1, wherein information concerning a reduced frame rate is sent to the remote device and used for restoring or increasing the original frame rate.

* * * * *